United States Patent [19]

Mason

[11] Patent Number: 5,676,239
[45] Date of Patent: Oct. 14, 1997

[54] SUPPORT ROD ASSEMBLY FOR TRACK TYPE CONVEYOR

[76] Inventor: William R. Mason, 2322 Pine Tree Ct., Kissimmee, Fla. 34744

[21] Appl. No.: 655,071

[22] Filed: Jun. 3, 1996

[51] Int. Cl.[6] .................................................. B65G 21/20
[52] U.S. Cl. .................................. 198/836.1; 198/836.3
[58] Field of Search .............................. 198/836.1, 836.2, 198/836.3

[56] References Cited

U.S. PATENT DOCUMENTS

| 3,788,457 | 1/1974 | Valentino, Jr. | 198/836.1 |
| 4,958,725 | 9/1990 | Meade et al. | 198/836.1 |

FOREIGN PATENT DOCUMENTS

| 2544292 | 10/1984 | France | 198/836.3 |
| 2439804 | 3/1976 | Germany | 198/836.1 |

*Primary Examiner*—James R. Bidwell
*Attorney, Agent, or Firm*—James H. Beusse

[57] ABSTRACT

A conveyor guide rail support device comprising an elongated stainless steel sleeve and a structural plastic member integrally molded in the sleeve having at least one end extending outward of the sleeve to form one side of a compression clamp. A mating side of the compression clamp is separately molded and releasably coupled to the integrally formed side using a threaded fastener which engages a nut integrally molded within one side of the clamp. Each side of the compression clamp is also formed with an alignment apparatus which allows the two sides of the compression clamp to be aligned when brought together into compression using the threaded fastener.

5 Claims, 2 Drawing Sheets

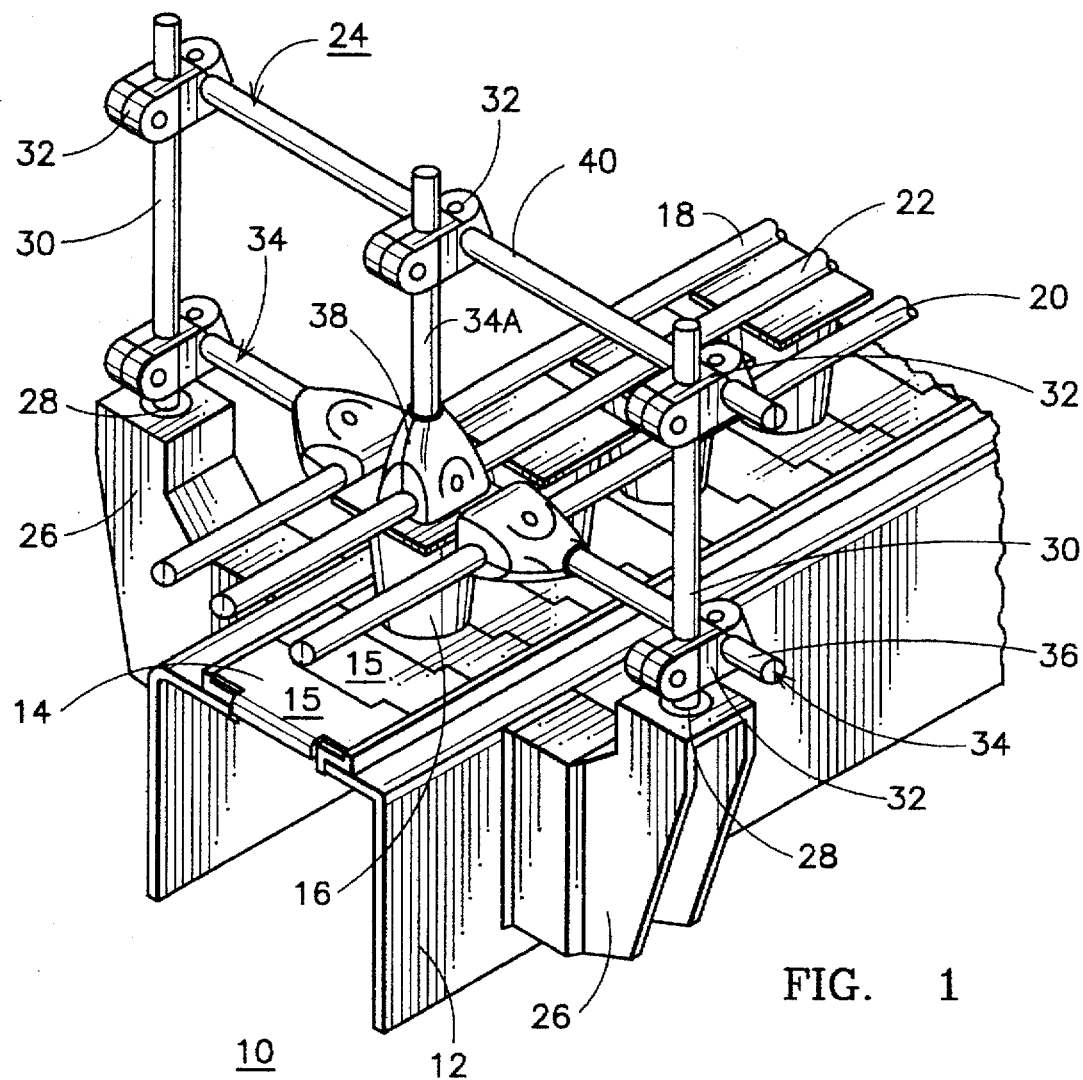
FIG. 1
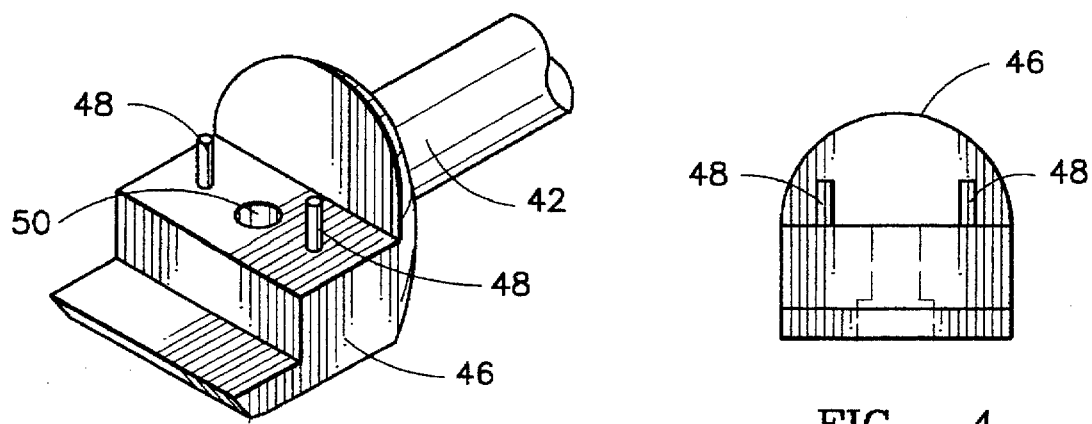
FIG. 3
FIG. 4

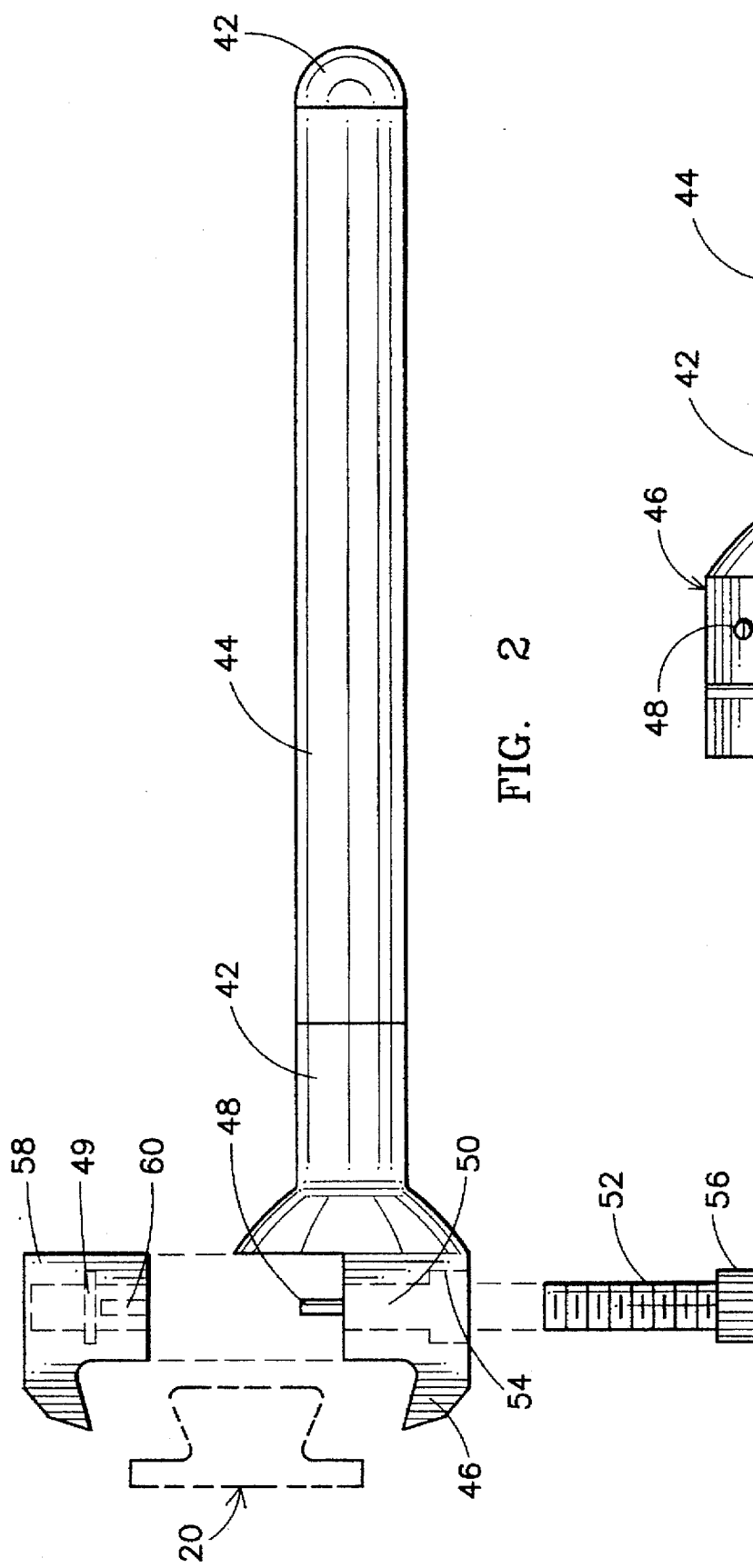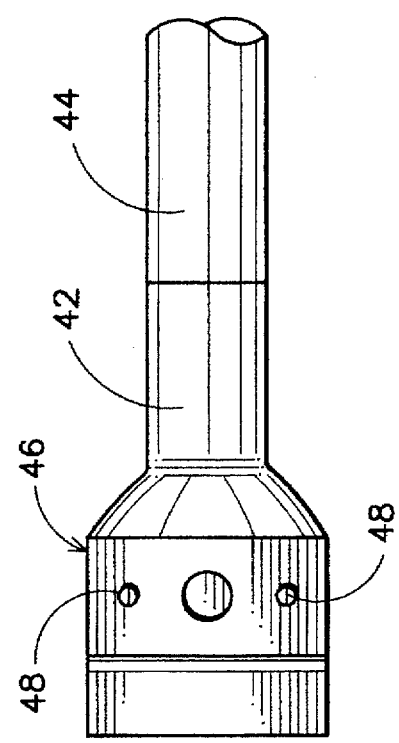

SUPPORT ROD ASSEMBLY FOR TRACK TYPE CONVEYOR

BACKGROUND OF THE INVENTION

The present invention relates to conveyor systems of the type having guide rails to direct a flow of articles on the conveyor system and, more particularly, to an apparatus for supporting the guide rails and method of using and manufacturing such apparatus.

Conveyors, either gravity feed or power driven, are used in transporting various products from one area of a manufacturing or packaging facility to another. A typical conveyor of the type with which the present invention may be used is a can or bottle conveyor used to move cans or bottles of beverages within a canning/bottling facility. This type conveyor generally includes adjustable guide rails which can be moved to accommodate different size products. For such adjustment, the guide rails are held in place by relatively complex arrangements of adjusting rods coupled to brackets mounted on the conveyor. Each adjusting rod is typically stainless steel combined with a removable clamp. The clamp may be steel or plastic and is either an end clamp or a split clamp. End clamps are generally in two parts that are brought together by a threaded fastener. Split clamps have split ends with the splits being at 90° so that rods can be adjustably joined at the same angle. Split clamps require two threaded fasteners, one for each split.

In setting up the guide rails, there are at least three separate adjustments for each support or adjusting rod. Further, each end clamp must be separately assembled to the adjusting rod and it is not uncommon for parts of the end clamp, e.g., one of the two halves or the screw or nut, to be dropped creating a delay and general annoyance in completing the adjustment.

A still further disadvantage of the prior art system is the use of a stainless steel rod for the adjusting rod. While wear qualities of stainless steel are desirable, such rods are expensive and heavy. Accordingly, it is desirable to provide an adjusting rod assembly which overcomes the above and other disadvantages of the prior art.

SUMMARY OF THE INVENTION

The above and other disadvantages of the prior art are overcome in a novel conveyor guide rail support device having an elongated stainless steel sleeve and a structural plastic member integrally molded in the sleeve with at least one end of the plastic member extending outward of the sleeve to form one side of a compression clamp. A second side of the compression clamp is independently formed of a plastic material and molded to be releasably coupled to the integral side using a metal nut molded into one of the sides of the compression clamp during manufacture. Preferably, alignment means are integrally molded in each side of the clamp and operate in conjunction with mating alignment means to align the two sides of the clamp into a proper clamping position. The invention further comprises the method of manufacturing a support rod including the steps of placing a stainless steel sleeve in an injection mold having an internal configuration corresponding to a desired configuration of the support shaft in one side of a clamp, the sleeve having an outer diameter which fits snugly within the mold. Plastic is then injected into the mold to completely fill the mold and flow into and through the steel sleeve. Plastic is cured to create a plastic rod having a steel encased shaft.

BRIEF DESCRIPTION OF THE DRAWINGS

For a better understanding of the present invention, reference may be had to the following detailed description taken in conjunction with the accompanying drawings in which:

FIG. 1 is a perspective view of a section of a track conveyor with which the present invention may be used;

FIG. 2 is an exploded view of an adjusting rod assembly in accordance with the present invention; and FIGS. 3, 4 and 5 are perspective, end and top views, respectively, of the clamp end of the rod assembly of FIG. 2.

DETAILED DESCRIPTION OF THE INVENTION

Referring to FIG. 1, there is shown a small section of a conventional product conveyor with which the present invention may be used. The typical conveyor system 10 includes a support base 12 supporting a track 14. Track 14 may be movable or, in the case of the gravity feed conveyor, a polished surface which allows the products 16 to slide on the surface. In the embodiment illustrated in FIG. 1, the track 14 is a movable track made of a plurality of segments 15 which are coupled together to enable the track to move forward and bend around the end of the track system and return to a starting point in a conventional endless loop. The products 16 are maintained in position on the track 14 by means of side guide rails 18 and 20 and an upper guide rail 22. In some instances, the upper guide rails are unnecessary and only the side guide rails 18 and 20 are used. Each of the side guide rails 18 and 20 and the top guide rail 22 are held in place by a support apparatus 24 attached to side members of support base 12 by means of brackets 26. The brackets 26 are typically bolted to the support rod 12. At the top end of each bracket 26 there is a receptacle 28 for holding a stainless steel rod 30. Each of the receptacles 28 may be adapted with a set screw or other fastening means to fixedly maintain the rods 30 in a generally perpendicular direction with respect to the track 14. The generally vertically oriented rods 30 provide the primary support for the apparatus 24.

Plastic or metal clamps 32 are used throughout the apparatus 24 for attaching support rods to the vertical rods 30. The side rails 18 and 20 are each supported by horizontally oriented side support rods 34. Each of the side support rods 34 comprises an elongated shaft member 36 which terminates in an end clamp 38. Each of the clamping members 32 comprises a short member having ends split by slotting with the slot terminating in a through aperture adapted for passage of one of the vertical support rods 30 or one of the shafts 36 of the side clamp rods 34. The apertures passing through the ends of the clamps 32 are rotated 90° so that the side support rod 34, for example, can extend perpendicularly with respect to the vertical support rod 30. Each of the ends of the clamps 32 is adapted to receive a bolt or other type of threaded fastener which allows the ends to be clamped tightly together about the rods passing through the apertures in the clamps so that the rods are fixed in position with respect to each other. The end clamp 38 is typically a two-part clamp which has an opening for receiving an end of the rod 36 and a through aperture for passing one of the guide rails. The two halves of the end clamp 38 are similarly held together by means of a threaded fastener such as a nut and bolt assembly. The top guide rail 22 is typically supported from above as shown in FIG. 1 and such support is achieved by providing a longer support rod 40 extending across the conveyor from rod 30 on one side to a rod 30 on another side. The clamps 32 are used to clamp the rod 40 to each of the rods 30. A separate clamp 32 is then used to attach another guide rail support rod 34A so that the guide rail support rod 34A connected to guide rail 22 hangs from the upper rod 40. A clamp 38 from the end of the guide rail support rod 34A is attached to the top of guide rail 22.

A major problem with using the type of system illustrated in FIG. 1 is that there are so many separate pieces which must be coupled together in order to attach the guide rails to the support apparatus 24. For example, a typical installation process requires that the bottom half of one of the rod end clamps 38 be positioned on the guide rail with a nut held in place in the bottom portion of the clamp. The top half of the rod end clamp is then placed on top of the bottom half and then the stainless steel rod 36 is then inserted between the top and bottom halves of the end clamp 38. The bolt or screw is then inserted through the top half of the end clamp and threaded into the nut to hold the pieces together while the assembler must at the same time hold the two end pieces in the clamp position while supporting the rod 36. Accordingly, the assembly and positioning of the side guide rails to the associated support rods tends to be very tedious work. Furthermore, a typical stainless steel adjusting rod of only five inches in length weighs approximately 152 grams and is therefore difficult to support while at the same time trying to position and thread the fastening bolt or screw through the two parts of the end clamp. The present invention overcomes the assembly problem of prior art support rods by integrally molding a support rod with a plastic shaft having an integral bottom half of the end clamp molded with the support rod. In the molding process, a stainless steel tube or sleeve is placed in the mold and the plastic material of the clamp is molded through the sleeve so that the sleeve is supported internally by the plastic. This arrangement provides a very strong support rod having an excellent outer bearing surface formed from a stainless steel tube but at the same time providing a support rod which is relatively lightweight. For example, the support rod which is integrally molded from plastic material using the stainless steel sleeve has a total weight for a five inch rod of only 58.5 grams. This is approximately one-third the weight of the five inch solid stainless steel rod. Furthermore, by integrally molding one half of the end clamp with the support rod, the problem associated with attempting to hold the rod and both halves of the end clamp is alleviated. In use, the rod with the bottom half end clamp can be placed in position on a guide rail so that the only loose part is the upper half of the end clamp. The upper half of the end clamp can then be laid on the bottom half and the screw passed through the upper half and into a nut which is integrally molded into the bottom half of the end clamp.

Turning now to FIG. 2, there is shown an exploded view of a guide rail support rod in accordance with the present invention. The new type of support rod includes a solid plastic shaft 42 with an outer steel sleeve or tube 44 integrally molded with the plastic rod. The clamp end of the rod includes an integrally molded bottom-half clamp section 46 which includes a pair of spaced guide members 48 (best seen in FIG. 3) and a through-hole 50 for passage of a bolt or screw 52. The hole 50 is counter-sunk as indicated at 54 so that head 56 of bolt 52 can be flush with the outer surface of the clamp section 46. The upper half clamp section 58 is separately molded and includes an embedded nut 49 molded into the plastic material of the clamp. The use of the embedded nut alleviates the problem previously associated with the tendency to drop the nut, handle or the bolt when there were too many parts to be held in place in order to assemble the support rod. Clamp section 58 also includes apertures 60 configured and positioned to receive the guide members 48.

FIG. 2 also shows in phantom a cross-section of one form of guide rail 20 with which the inventive support rod may be used. FIG. 3 is a front perspective view of the illustrated form of clamp end section 46. FIGS. 4 and 5 are front and plan views of the clamp end section 46. It will be appreciated that the design of the end clamp can be modified for different types of rails 20.

In manufacture of the inventive support rod, applicant creates a mold having a mold cavity with the desired final configuration of the support rod. Preferably, the mold is formed in two parts which are brought together to form a closed cavity. The sleeve or tube 44 is positioned in one of the mold sections before the sections are closed. The bottom half clamp section 46 and the rod shaft 42 are then formed by injection of molten plastic into them old. The plastic is injected so as to flow though and fill the sleeve 44 with some of the plastic extending on each end of the sleeve as shown in FIG. 2. The resulting rod is then cured and removed from the mold in a conventional manner.

The upper half clamp section 58 is separately molded using an injection mold having a cavity of the clamp section configuration. The mold is adapted to receive a threaded insert with a nut that seats in the mold cavity so that the final molded clamp section includes the embedded nut. Further, the threaded insert forms threads in the molded clamp section of the same size and type as the nut so that when the upper and lower clamp sections are assembled, the thread fastener will seat tightly in the upper clamp section. The holes in the upper clamp section and the guide posts in the lower clamp section are molded in place using conventional techniques of mold forming.

While the invention has been described in what is presently considered to be a preferred embodiment, many variations and modifications will become apparent to those skilled in the art. Accordingly, it is intended that the invention not be limited to the specific illustrative embodiment but be interpreted within the full spirit and scope of the appended claims.

What is claimed is:

1. A conveyor guide rail support device comprising:
    an elongated stainless steel sleeve; and
    a structural plastic member integrally molded in said sleeve and having at least one end extending outward of said sleeve to form one side of a compression clamp.

2. The conveyor guide rail support device of claim 1 and including another side of said clamp releasably coupled to said one side, said one side and said another side operating conjointly to form a compression clamp for grasping a conveyor guide rail.

3. The conveyor guide rail support device of claim 2 and including alignment means integrally formed in said one side of said clamp and operatively associated with mating alignment means on said another side of said clamp for aligning said one and another sides in a clamping position.

4. The conveyor guide rail support device of claim 3 wherein said another side of said clamp is adjustably coupled to said one side by a threaded fastener.

5. The conveyor guide rail support device of claim 4 wherein said threaded fastener comprises a screw passing through an aperture in said one side of said clamp and engaging a nut integrally molded in said another side of said clamp.

* * * * *